(12) United States Patent  
Salter et al.

(10) Patent No.: US 10,173,604 B2  
(45) Date of Patent: Jan. 8, 2019

(54) ILLUMINATED VEHICLE CONSOLE

(71) Applicant: Ford Global Technologies, LLC, Dearborn, MI (US)

(72) Inventors: Stuart C. Salter, White Lake, MI (US); Scott Holmes Dunham, Redford, MI (US); Anthony Dwayne Cooprider, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/245,739

(22) Filed: Aug. 24, 2016

(65) Prior Publication Data

US 2018/0056887 A1    Mar. 1, 2018

(51) Int. Cl.
| | |
|---|---|
| *B60R 11/00* | (2006.01) |
| *B60R 11/02* | (2006.01) |
| *B60Q 3/225* | (2017.01) |
| *B60Q 3/64* | (2017.01) |
| *H02J 7/02* | (2016.01) |
| *H02J 7/00* | (2006.01) |
| *H02J 50/10* | (2016.01) |

(52) U.S. Cl.
CPC .............. *B60R 11/02* (2013.01); *B60Q 3/225* (2017.02); *B60Q 3/64* (2017.02); *H02J 7/0044* (2013.01); *H02J 7/025* (2013.01); *B60R 2011/0007* (2013.01); *H02J 50/10* (2016.02)

(58) Field of Classification Search
CPC .. H02J 2007/005; H02J 7/0044; H02J 7/0047; B60R 2011/0007; B60Q 3/225

USPC ............................................. 296/24.34, 37.12
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,234,439 | B1 * | 5/2001 | Townsend .............. B60N 3/102 248/309.1 |
| 6,294,990 | B1 | 9/2001 | Knoll et al. |
| 6,419,379 | B1 | 7/2002 | Hulse |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Pinel E Romain
(74) *Attorney, Agent, or Firm* — Vichit Chea; Price Heneveld LLP

(57) ABSTRACT

An illuminated center console has an outer bin, an inner bin positioned within the outer bin, a light source positioned within the outer bin and configured to emit light into the inner bin, a first and a second support member positioned above the inner and outer bins, and at least one wireless charger positioned proximate the inner bin.

20 Claims, 5 Drawing Sheets

(56) References Cited

U.S. PATENT DOCUMENTS

| | | | | |
|---|---|---|---|---|
| 6,820,888 | B1 | 11/2004 | Griffin | |
| 6,851,840 | B2 | 2/2005 | Ramamurthy et al. | |
| 6,859,148 | B2 | 2/2005 | Miller | |
| 6,871,986 | B2 | 3/2005 | Yamanaka et al. | |
| 6,953,536 | B2 | 10/2005 | Yen et al. | |
| 6,990,922 | B2 | 1/2006 | Ichikawa et al. | |
| 7,015,893 | B2 | 3/2006 | Li et al. | |
| 7,161,472 | B2 | 1/2007 | Strumolo et al. | |
| 7,213,923 | B2 | 5/2007 | Liu et al. | |
| 7,216,997 | B2 | 5/2007 | Anderson, Jr. | |
| 7,249,869 | B2 | 7/2007 | Takahashi et al. | |
| 7,264,366 | B2 | 9/2007 | Hulse | |
| 7,264,367 | B2 | 9/2007 | Hulse | |
| 7,287,885 | B2 | 10/2007 | Radu et al. | |
| 7,347,576 | B2 | 3/2008 | Wang et al. | |
| 7,441,914 | B2 | 10/2008 | Palmer et al. | |
| 7,501,749 | B2 | 3/2009 | Takeda et al. | |
| 7,575,349 | B2 | 8/2009 | Bucher et al. | |
| 7,635,212 | B2 | 12/2009 | Seidler | |
| 7,708,436 | B2* | 5/2010 | Lota | B60N 3/101 362/154 |
| 7,726,856 | B2 | 6/2010 | Tsutsumi | |
| 7,745,818 | B2 | 6/2010 | Sofue et al. | |
| 7,753,541 | B2 | 7/2010 | Chen et al. | |
| 7,798,548 | B2 | 9/2010 | Embach et al. | |
| 7,810,969 | B2 | 10/2010 | Blackmore et al. | |
| 7,834,548 | B2 | 11/2010 | Jousse et al. | |
| 7,862,220 | B2 | 1/2011 | Cannon et al. | |
| RE42,340 | E | 5/2011 | Anderson et al. | |
| 7,987,030 | B2 | 7/2011 | Flores et al. | |
| 8,016,465 | B2 | 9/2011 | Egerer et al. | |
| 8,022,818 | B2 | 9/2011 | la Tendresse et al. | |
| 8,044,415 | B2 | 10/2011 | Messere et al. | |
| 8,066,416 | B2 | 11/2011 | Bucher | |
| 8,071,988 | B2 | 12/2011 | Lee et al. | |
| 8,097,843 | B2 | 1/2012 | Agrawal et al. | |
| 8,118,441 | B2 | 2/2012 | Hessling | |
| 8,120,236 | B2 | 2/2012 | Auday et al. | |
| 8,136,425 | B2 | 3/2012 | Bostick | |
| 8,162,520 | B2 | 4/2012 | Penner | |
| 8,163,201 | B2 | 4/2012 | Agrawal et al. | |
| 8,169,131 | B2 | 5/2012 | Murazaki et al. | |
| 8,178,852 | B2 | 5/2012 | Kingsley et al. | |
| 8,197,105 | B2 | 6/2012 | Yang | |
| 8,203,260 | B2 | 6/2012 | Li et al. | |
| 8,207,511 | B2 | 6/2012 | Bortz et al. | |
| 8,232,533 | B2 | 7/2012 | Kingsley et al. | |
| 8,247,761 | B1 | 8/2012 | Agrawal et al. | |
| 8,261,686 | B2 | 9/2012 | Birman et al. | |
| 8,286,378 | B2 | 10/2012 | Martin et al. | |
| 8,317,329 | B2 | 11/2012 | Seder et al. | |
| 8,317,359 | B2 | 11/2012 | Harbers et al. | |
| 8,317,378 | B2* | 11/2012 | Dixon | B60Q 3/82 315/77 |
| 8,408,766 | B2 | 4/2013 | Wilson et al. | |
| 8,415,642 | B2 | 4/2013 | Kingsley et al. | |
| 8,421,811 | B2 | 4/2013 | Odland et al. | |
| 8,439,418 | B1* | 5/2013 | Lovejoy | B60R 7/06 296/37.12 |
| 8,459,832 | B2 | 6/2013 | Kim | |
| 8,466,438 | B2 | 6/2013 | Lambert et al. | |
| 8,519,359 | B2 | 8/2013 | Kingsley et al. | |
| 8,519,362 | B2 | 8/2013 | Labrot et al. | |
| 8,539,702 | B2 | 9/2013 | Li et al. | |
| 8,552,848 | B2 | 10/2013 | Rao et al. | |
| 8,606,430 | B2 | 12/2013 | Seder et al. | |
| 8,616,605 | B2 | 12/2013 | Hipshier et al. | |
| 8,624,716 | B2 | 1/2014 | Englander | |
| 8,631,598 | B2 | 1/2014 | Li et al. | |
| 8,653,553 | B2 | 2/2014 | Yamazaki et al. | |
| 8,664,624 | B2 | 3/2014 | Kingsley et al. | |
| 8,683,722 | B1 | 4/2014 | Cowan | |
| 8,714,617 | B2* | 5/2014 | Hipshier | B60R 7/04 296/24.34 |
| 8,724,054 | B2 | 5/2014 | Jones | |
| 8,754,426 | B2 | 6/2014 | Marx et al. | |
| 8,773,012 | B2 | 7/2014 | Ryu et al. | |
| 8,816,636 | B2 | 8/2014 | Shinde et al. | |
| 8,846,184 | B2 | 9/2014 | Agrawal et al. | |
| 8,851,694 | B2 | 10/2014 | Harada | |
| 8,876,352 | B2 | 11/2014 | Robbins et al. | |
| 8,905,610 | B2 | 12/2014 | Coleman et al. | |
| 8,952,341 | B2 | 2/2015 | Kingsley et al. | |
| 8,994,495 | B2 | 3/2015 | Dassanayake et al. | |
| 9,006,751 | B2 | 4/2015 | Kleo et al. | |
| 9,018,833 | B2 | 4/2015 | Lowenthal et al. | |
| 9,057,021 | B2 | 6/2015 | Kingsley et al. | |
| 9,059,378 | B2 | 6/2015 | Verger et al. | |
| 9,065,447 | B2 | 6/2015 | Buttolo et al. | |
| 9,067,530 | B2 | 6/2015 | Bayersdorfer et al. | |
| 9,124,109 | B2* | 9/2015 | Lota | H02J 7/0047 |
| 9,187,034 | B2 | 11/2015 | Tarahomi et al. | |
| 9,283,890 | B1* | 3/2016 | Huebner | B60R 7/04 |
| 9,299,887 | B2 | 3/2016 | Lowenthal et al. | |
| 9,315,148 | B2 | 4/2016 | Schwenke et al. | |
| 9,399,427 | B2* | 7/2016 | Salter | B60Q 3/64 |
| 9,452,709 | B2 | 9/2016 | Aburto Crespo | |
| 9,568,659 | B2 | 2/2017 | Verger et al. | |
| 9,583,968 | B2* | 2/2017 | Salter | A61L 2/10 |
| 9,616,812 | B2 | 4/2017 | Sawayanagi | |
| 2002/0159741 | A1* | 10/2002 | Graves | B60Q 1/26 385/133 |
| 2002/0163792 | A1 | 11/2002 | Formosa | |
| 2003/0167668 | A1 | 9/2003 | Fuks et al. | |
| 2003/0179548 | A1 | 9/2003 | Becker et al. | |
| 2004/0213088 | A1 | 10/2004 | Fuwausa | |
| 2005/0084229 | A1 | 4/2005 | Babbitt et al. | |
| 2005/0189795 | A1 | 9/2005 | Roessler | |
| 2006/0087826 | A1 | 4/2006 | Anderson, Jr. | |
| 2006/0097121 | A1* | 5/2006 | Fugate | A47G 23/0309 248/311.2 |
| 2007/0032319 | A1 | 2/2007 | Tufte | |
| 2007/0177397 | A1 | 8/2007 | Sakakibara et al. | |
| 2007/0285938 | A1 | 12/2007 | Palmer et al. | |
| 2007/0297045 | A1 | 12/2007 | Sakai et al. | |
| 2008/0205075 | A1 | 8/2008 | Hikmet et al. | |
| 2009/0217970 | A1 | 9/2009 | Zimmerman et al. | |
| 2009/0219730 | A1 | 9/2009 | Syfert et al. | |
| 2009/0251920 | A1 | 10/2009 | Kino et al. | |
| 2009/0260562 | A1 | 10/2009 | Folstad et al. | |
| 2009/0262515 | A1 | 10/2009 | Lee et al. | |
| 2010/0102736 | A1 | 4/2010 | Hessling | |
| 2010/0270928 | A1 | 10/2010 | Dixon | |
| 2011/0012062 | A1 | 1/2011 | Agrawal et al. | |
| 2011/0265360 | A1 | 11/2011 | Podd et al. | |
| 2012/0001406 | A1 | 1/2012 | Paxton et al. | |
| 2012/0062175 | A1 | 3/2012 | Miller et al. | |
| 2012/0104954 | A1 | 5/2012 | Huang | |
| 2012/0183677 | A1 | 7/2012 | Agrawal et al. | |
| 2012/0280528 | A1 | 11/2012 | Dellock et al. | |
| 2013/0050979 | A1 | 2/2013 | Van De Ven et al. | |
| 2013/0092965 | A1 | 4/2013 | Kijima et al. | |
| 2013/0285603 | A1 | 10/2013 | Zeinstra et al. | |
| 2013/0335994 | A1 | 12/2013 | Mulder et al. | |
| 2014/0003044 | A1 | 1/2014 | Harbers et al. | |
| 2014/0029281 | A1 | 1/2014 | Suckling et al. | |
| 2014/0065442 | A1 | 3/2014 | Kingsley et al. | |
| 2014/0103258 | A1 | 4/2014 | Agrawal et al. | |
| 2014/0211498 | A1 | 7/2014 | Cannon et al. | |
| 2014/0264396 | A1 | 9/2014 | Lowenthal et al. | |
| 2014/0266666 | A1 | 9/2014 | Habibi | |
| 2014/0373898 | A1 | 12/2014 | Rogers et al. | |
| 2015/0046027 | A1 | 2/2015 | Sura et al. | |
| 2015/0085488 | A1 | 3/2015 | Grote, III et al. | |
| 2015/0109602 | A1 | 4/2015 | Martin et al. | |
| 2015/0138789 | A1 | 5/2015 | Singer et al. | |
| 2015/0162781 | A1* | 6/2015 | Fratti | H02J 7/0027 320/101 |
| 2015/0267881 | A1 | 9/2015 | Salter et al. | |
| 2015/0307033 | A1 | 10/2015 | Preisler et al. | |
| 2016/0016494 | A1* | 1/2016 | Farooq | B60N 2/466 297/411.21 |
| 2016/0016506 | A1 | 1/2016 | Collins et al. | |
| 2016/0087485 | A1 | 3/2016 | Maeda et al. | |

(56) References Cited

U.S. PATENT DOCUMENTS

| | | |
|---|---|---|
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2016/0344221 A1* | 11/2016 | Kramer .................. H02J 7/025 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102006035507 B4 | 4/2013 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

ILLUMINATED VEHICLE CONSOLE

FIELD OF THE INVENTION

The present invention generally relates to a vehicle lighting apparatus, and more particularly, to an illuminated console for a vehicle.

BACKGROUND OF THE INVENTION

Consoles within a vehicle may be configured to charge various electronic devices. Illumination of the charging consoles may provide a unique and attractive viewing experience.

SUMMARY OF THE INVENTION

According to one aspect of the present invention, an illuminated center console has an outer bin and an inner bin positioned within the outer bin. A light source is positioned within the outer bin and configured to emit light into the inner bin. First and second support members are positioned above the inner and outer bins. At least one wireless charger is positioned proximate the inner bin.

According to another aspect of the present invention, an illuminated console has a housing defining an elongate opening, a first support member and a second support member positioned within the housing and configured to extend over the elongate opening, an inner bin having an interior surface and an exterior surface, a light source positioned at a base of the inner bin, and at least one wireless charger positioned on the exterior surface of the inner bin.

According to yet another aspect of the present invention, an illuminated console has a housing defining an elongate opening, an inner bin positioned within the housing defining an interior surface and an exterior surface, wherein the inner bin is accessible through the elongate opening, a reflective coating positioned on the interior surface, and a wireless charger positioned on the exterior surface of the inner bin.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
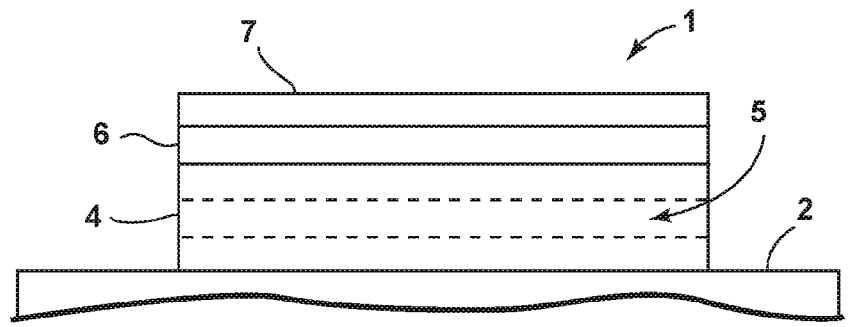
FIG. 1A is a side view of a photoluminescent structure rendered as a coating for use in a vehicle light strip according to one embodiment.
Figure 1B:
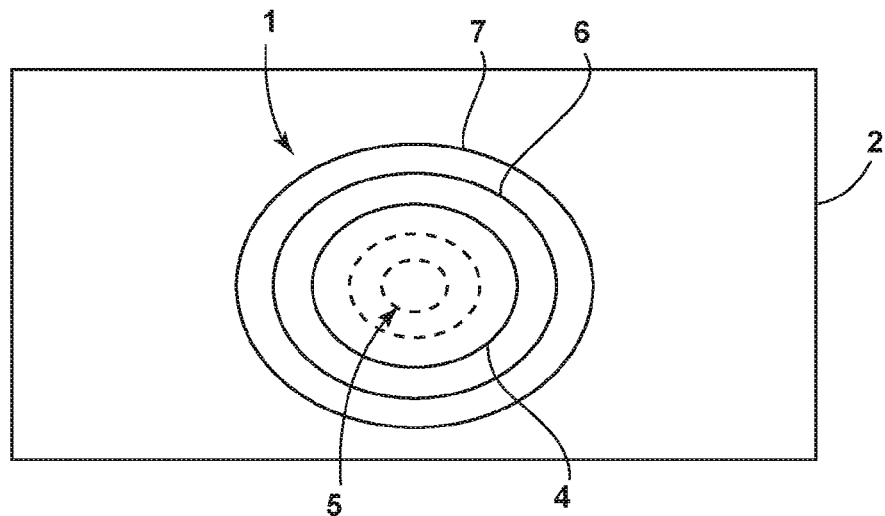
FIG. 1B is a top view of a photoluminescent structure rendered as a discrete particle according to one embodiment.
Figure 1C:
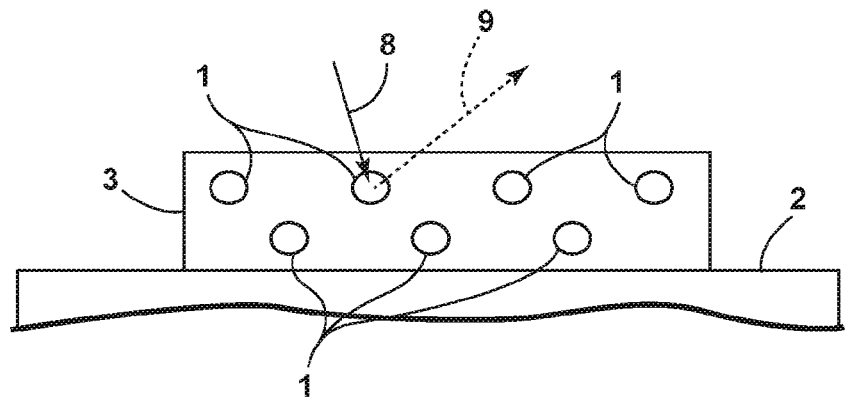
FIG. 1C is a side view of a plurality of photoluminescent structures rendered as discrete particles and incorporated into a separate structure.

Referring to FIGS. 1A-1C, various exemplary embodiments of photoluminescent structures 1 are shown, each capable of being coupled to a substrate 2, which may correspond to a vehicle fixture or vehicle related piece of equipment. In FIG. 1A, the photoluminescent structure 1 is generally shown rendered as a coating (e.g., a film) that may be applied to a surface of the substrate 2. In FIG. 1B, the photoluminescent structure 1 is generally shown as a discrete particle capable of being integrated with a substrate 2. In FIG. 1C, the photoluminescent structure 1 is generally shown as a plurality of discrete particles that may be incorporated into a support medium 3 (e.g., a film) that may then be applied (as shown) or integrated with the substrate 2.

At the most basic level, a given photoluminescent structure 1 includes an energy conversion layer 4 that may include one or more sublayers, which are exemplarily shown through broken lines in FIGS. 1A and 1B. Each sublayer of the energy conversion layer 4 may include one or more photoluminescent materials 5 having energy converting elements with phosphorescent or fluorescent properties. Each photoluminescent material 5 may become excited upon receiving an excitation emission 8 of a specific wavelength, thereby causing the light to undergo a conversion process. Under the principle of down conversion, the excitation emission 8 is converted into a longer wavelength, converted light 9, that is outputted from the photoluminescent structure 1. Conversely, under the principle of up conversion, the excitation emission 8 is converted into a shorter wavelength light that is outputted from the photoluminescent structure 1. When multiple distinct wavelengths of light are outputted from the photoluminescent structure 1 at the same time, the wavelengths of light may mix together and be expressed as a multicolor light.

Light emitted by a light source 70 (FIG. 3) is referred to herein as the excitation emission 8 or excitation light and is illustrated herein as solid arrows. In contrast, light emitted from the photoluminescent structure 1 is referred to herein as converted light 9 and is illustrated herein as broken arrows. The mixture of excitation emission 8 and converted light 9 that may be emitted simultaneously is referred to herein as outputted light.

The energy conversion layer 4 may be prepared by dispersing the photoluminescent material 5 in a polymer matrix to form a homogenous mixture using a variety of methods. Such methods may include preparing the energy conversion layer 4 from a formulation in a liquid carrier support medium 9 and coating the energy conversion layer 4 to a desired substrate 2. The energy conversion layer 4 may be applied to a substrate 2 by painting, screen-printing, spraying, slot coating, dip coating, roller coating, and bar coating. Alternatively, the energy conversion layer 4 may be prepared by methods that do not use a liquid carrier support medium 3. For example, the energy conversion layer 4 may be rendered by dispersing the photoluminescent material 5 into a solid-state solution (homogenous mixture in a dry state) that may be incorporated in a polymer matrix, which may be formed by extrusion, injection molding, compression molding, calendaring, thermoforming, etc. The energy conversion layer 4 may then be integrated into a substrate 2 using any methods known to those skilled in the art. When the energy conversion layer 4 includes sublayers, each sublayer may be sequentially coated to form the energy conversion layer 4. Alternatively, the sublayers can be separately prepared and later laminated or embossed together to form the energy conversion layer 4. Alternatively still, the energy conversion layer 4 may be formed by coextruding the sublayers.

In some embodiments, the converted light 9 that has been down converted or up converted may be used to excite other photoluminescent material(s) 5 found in the energy conversion layer 4. The process of using the converted light 9 outputted from one photoluminescent material 5 to excite another, and so on, is generally known as an energy cascade and may serve as an alternative for achieving various color expressions. With respect to either conversion principle, the difference in wavelength between the excitation emission 8 and the converted light 9 is known as the Stokes shift and serves as the principal driving mechanism for an energy conversion process corresponding to a change in wavelength of light. In the various embodiments discussed herein, each of the photoluminescent structures 1 may operate under either conversion principle.

Referring back to FIGS. 1A and 1B, the photoluminescent structure 1 may optionally include at least one stability layer 6 to protect the photoluminescent material 5 contained within the energy conversion layer 4 from photolytic and thermal degradation. The stability layer 6 may be configured as a separate layer optically coupled and adhered to the energy conversion layer 4. Alternatively, the stability layer 6 may be integrated with the energy conversion layer 4. The photoluminescent structure 1 may also optionally include a protective layer 7 optically coupled and adhered to the stability layer 6 or other layer (e.g., the conversion layer 4 in the absence of the stability layer 6) to protect the photoluminescent structure 1 from physical and chemical damage arising from environmental exposure. The stability layer 6 and/or the protective layer 7 may be combined with the energy conversion layer 4 through sequential coating or printing of each layer, sequential lamination or embossing, or any other suitable means.

Additional information regarding the construction of photoluminescent structures 1 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 to Agrawal et al., entitled "CHROMIC LUMINESCENT COMPOSITIONS AND TEXTILES," all of which are incorporated herein by reference in their entirety.

According to one embodiment, the photoluminescent material 5 may include organic or inorganic fluorescent dyes including rylenes, xanthenes, porphyrins, and phthalocyanines. Additionally, or alternatively, the photoluminescent material 5 may include phosphors from the group of Ce-doped garnets such as YAG:Ce and may be a short persistence photoluminescent material 5. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation emission 8 and the moment when the light intensity of the converted light 9 emitted from the photoluminescent structure 1 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet-type Ce phosphor may serve as the photoluminescent material 5 with ultra-short persistence characteristics, which can emit the converted light 9 by absorbing purple to blue excitation emission 8 emitted from the light source 70. According to one embodiment, a ZnS:Ag phosphor may be used to create a blue converted light 9. A ZnS:Cu phosphor may be utilized to create a yellowish-green converted light 9. A $Y_2O_2S$:Eu phosphor may be used to create red converted light 9. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 5, according to one embodiment, disposed within the photoluminescent structure 1 may include a long persistence photoluminescent material 5 that emits the converted light 9, once charged by the excitation emission 8. The excitation emission 8 may be emitted from any excitation source (e.g., any natural light source, such as the sun, and/or any artificial light source 70). The long persistence photoluminescent material 5 may be defined as having a long decay time due to its ability to store the excitation emission 8 and release the converted light 9 gradually, for a period of several minutes or hours, once the excitation emission 8 is no longer present.

The long persistence photoluminescent material 5, according to one embodiment, may be operable to emit light at or above an intensity of 0.32 mcd/m$^2$ after a period of 10 minutes. Additionally, the long persistence photoluminescent material 5 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 5 may continually illuminate in response to excitation from any light sources that emit the excitation emission 8, including, but not limited to, natural light sources (e.g., the sun) and/or any artificial light source 70. The periodic absorption of the excitation emission 8 from any excitation source may provide for a substantially sustained charge of the long persistence photoluminescent material 5 to provide for consistent passive illumination. In some embodiments, a light sensor may monitor the illumination intensity of the photoluminescent structure 1 and actuate an excitation source when the illumination intensity falls below 0.32 mcd/m$^2$, or any other predefined intensity level.

The long persistence photoluminescent material 5 may correspond to alkaline earth aluminates and silicates, for example doped di-silicates, or any other compound that is capable of emitting light for a period of time once the excitation emission 8 is no longer present. The long persistence photoluminescent material 5 may be doped with one or more ions, which may correspond to rare earth elements, for example, $Eu^{2+}$, $Tb^{3+}$ and/or $Dy^3$. According to one non-limiting exemplary embodiment, the photoluminescent structure 1 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 1, according to one embodiment, may be a translucent white color, and in some instances reflective, when unilluminated. Once the photoluminescent structure 1 receives the excitation emission 8 of a particular wavelength, the photoluminescent structure 1 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation emission 8 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 1. It will be understood that the compositions provided herein are non-limiting examples. Thus, any phosphor known in the art may be utilized within the photoluminescent structure 1 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
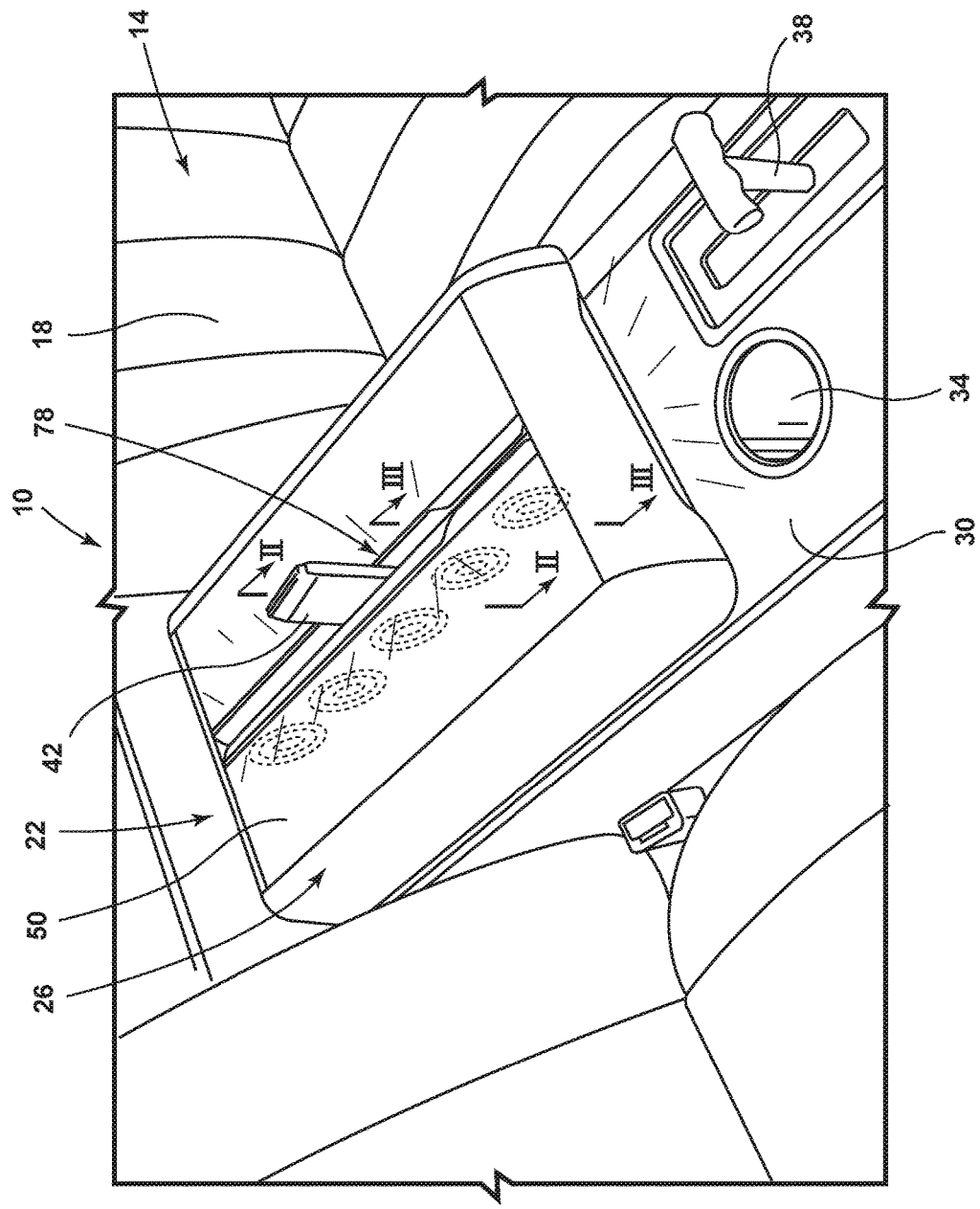
FIG. 2 is a perspective view of a passenger compartment of a vehicle, according to one embodiment.

Referring now to FIG. 2, a vehicle 10 is depicted which includes an interior 14. Positioned within the interior 14 of the vehicle 10 is at least one seat 18. In the depicted embodiment there are two seats 18, but it will be understood that more than two seats 18 may be included within the vehicle interior 14. Positioned between the seats 18 is a console assembly 22. Although depicted as a center console, it will be understood that the description of the console assembly 22 laid out below may equally be applied to consoles elsewhere in the vehicle 10. For example, the console assembly 22 may be positioned in a rear seat area of the interior 14, in an instrument panel, in a door panel or other locations within the interior 14. The console assembly 22 includes a console 26 and a forward portion 30. In the depicted embodiment, the forward portion 30 includes a cup holder 34 and a gear lever 38 and is positioned lower than the console 26. As explained in greater detail below, the console 26 may be configured to hold and charge at least one electronic device 42.

Figure 3:
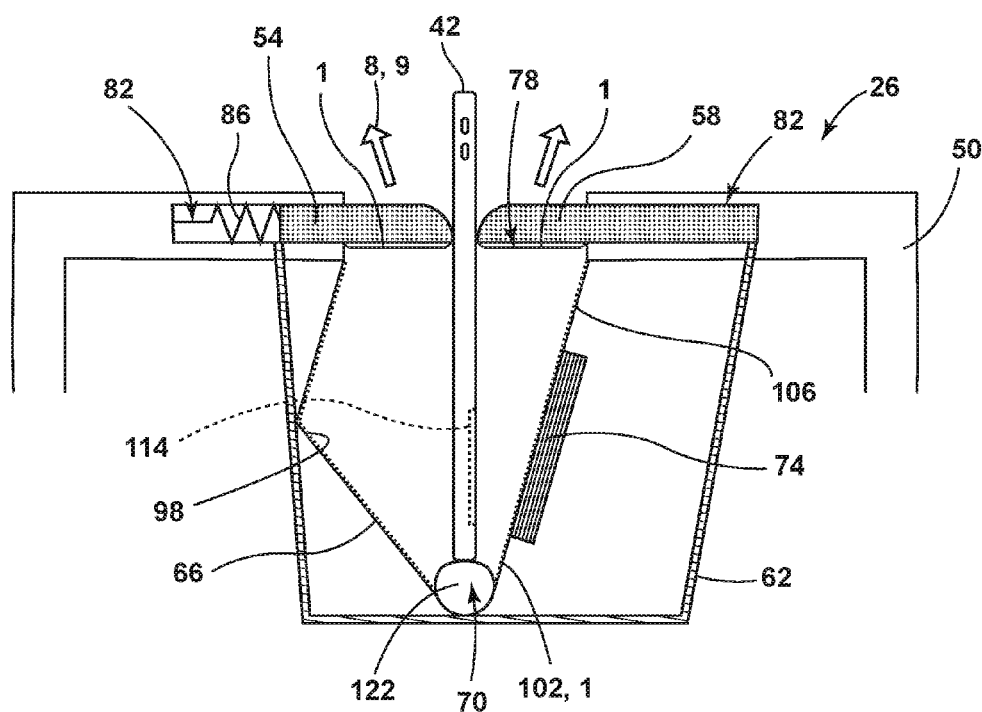
FIG. 3 is a cross-sectional view taken at line II of FIG. 2, according to one embodiment.

Referring now to FIGS. 2 and 3, the console 26 includes a housing 50, a first support member 54, a second support member 58, an outer bin 62, an inner bin 66, a light source 70 and a wireless charger 74. The first and second support members 54, 58, the inner bin 66 and the light source 70 cooperate to support the electronic device 42 within the console 26. The housing 50 defines an elongate opening 78 at a top of the console 26. Positioned proximate the elongate opening 78 are the first and second support members 54, 58. In the depicted embodiment, the first and second support members 54, 58 are positioned within the housing 50, but may also be supported underneath the housing without departing from the teachings provided herein. In the depicted configuration, the housing 50 defines pockets 82 within which the first and second support members 54, 58 are positioned. The pocket 82 within which the first support member 54 is positioned is deeper than the first support member 54 such that the first support member 54 may variably be positioned in and out of the housing 50. A biasing force may be applied to the first support member 54 via a spring-loaded assembly 86 such as a spring positioned within the pocket 82. Although depicted as fixed, the second support member 58 may be configured substantially similar to that of the first support member 54 such that it may be variably positioned within the housing 50. The first and second support members 54, 58 extend out of the housing 50 and into the elongate opening 78. The elongate opening 78 is configured to allow access to the inner bin 66. In operation, the electronic device 42 may be placed into the inner bin 66 by compressing the spring loaded assembly 86 to separate the first and second support members 54, 58 from each other. As explained above, the spring-loaded assembly 86 may provide a biasing force to the first support member 54 toward the second support member 58 such that a compressive force is generated by the first and second support members 54, 58 on the electronic device 42 thereby securing the electronic device 42 in place. Although shown as monolithic bodies extending the length of the elongate opening 78, the first and second support members 54, 58 may instead be replaced by a plurality of support bodies extending from the housing 50. Such an embodiment may be advantageous in providing a more secure retainment of the electronic device 42 as well as an aesthetically pleasing appearance as a gap the width of the electronic device 42 may not be formed the length of the elongate opening 78. The first and second support members 54, 58 may be formed of a plastic or metal material. In plastic embodiments, the first and/or second support members 54, 58 may be at least partially light transmissive, translucent, transparent or clear. Further, according to various embodiments, the first and/or second support members 54, 58 may include the photoluminescent structure 1 which is excited by the light source 70 as described in greater detail below.

In the depicted embodiment, the electronic device 42 extends though the elongate opening 78 and rests on the light source 70 within the inner bin 66. The light source 70 in the inner bin 66 may be positioned (e.g., height within the inner bin 66) such that a portion of the electronic device 42 protrudes from the console 26 (i.e., from between the first and second support members 54, 58). The inner bin 66 defines an interior surface 98 and an exterior surface 102. Positioned on the interior surface 98 of the inner bin 66 is a reflective layer 106. The reflective layer 106 may be a dye pigment or other layer configured to reflect visible and nonvisible light emanating from the light source 70 as well as ambient sources external to the console 26. For example, the reflective layer 106 may be a white paint, a vacuum metalized surface, or other reflective surface. Further, the reflective layer 106 may include the photoluminescent structure 1 or the photoluminescent material 5 which may be excited by the light (e.g., the excitation emission 8) from the light source 70. The inner bin 66 is generally shaped such that light from the light source 70 is reflected upwards toward the elongate opening 78 and the first and second support members 54, 58. Further, the walls of the inner bin 66 may be shaped such that the electronic device 42 is guided toward the light source 70, or a stable position within the inner bin 66. The inner bin 66, and the elongate opening 78 may be of such a size that a human finger may enter the inner bin 66 such that foreign objects and debris (e.g., coins, jewelry, pens, etc.) that may interfere with charging or positioning of the electronic device 42 may be removed from the inner bin 66.

Figure 4:
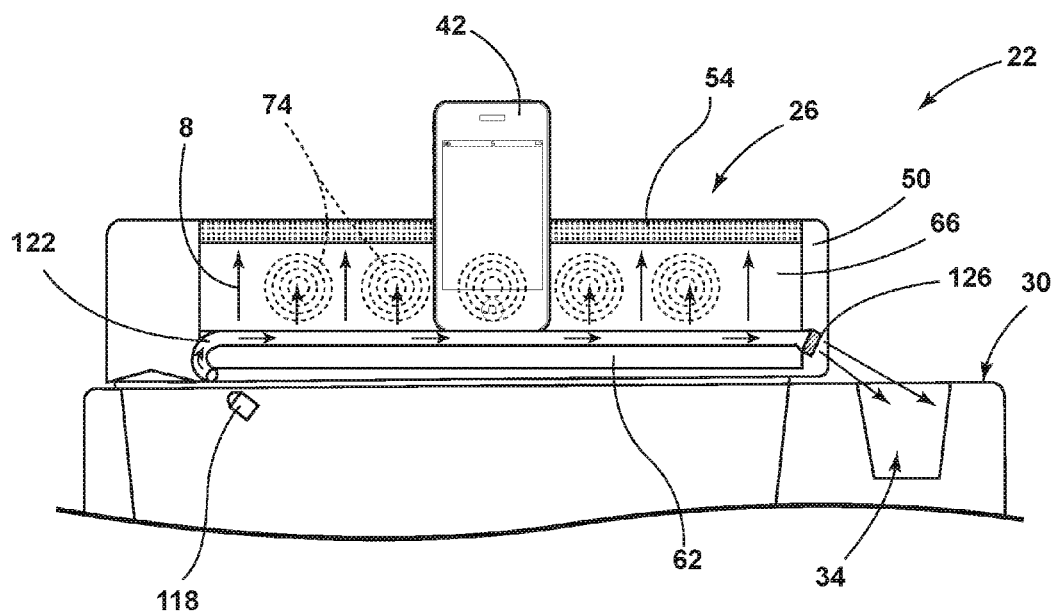
FIG. 4 is a cross-sectional view taken at line III of FIG. 2, according to one embodiment.

Referring now to FIGS. 3 and 4, positioned on the exterior surface 102 of the inner bin 66 is the wireless charger 74. In the depicted embodiment, five wireless chargers 74 are positioned on the inner bin 66, but it will be understood that more or less wireless chargers 74 may be used. The wireless chargers 74 may be configured to wirelessly charge the electronic device 42. For example, the electronic device 42 may include a charging coil 114 configured to receive electromagnetic waves from one or more of the wireless chargers 74. It will be understood that in examples utilizing more than one wireless charger 74, multiple electronic devices 42 may be positioned within the inner bin 66 and separately charged. For example, the electronic devices 42 may be stacked in a side-by-side arrangement along the length of the elongate opening 78, each electronic device 42 being held by the first and second support members 54, 58. The wireless chargers 74 may be loosely coupled or tightly coupled to the charging coil 114 of the electronic device 42.

Positioned around the inner bin 66 is the outer bin 62. The outer bin 62 encloses the light source 70, the inner bin 66 and the wireless charger 74. The outer bin 62 is positioned within the housing 50. The outer bin 62 may be composed of a plastic or metal having a conductance. For example, in plastic embodiments, the outer bin 62 may include conductive particles, fibers, films and/or coatings. In operation, the conductive outer bin 62 may function as an electromagnetic radiation shield, protecting occupants of the interior 14 of the vehicle 10 from electromagnetic radiation from the wireless charger 74 (i.e., minimize electromagnetic radiation flux across the outer bin 62). Additionally, the outer bin 62 may function to prevent electromagnetic radiation from interfering with the charging of the electronic device 42 by the wireless charger 74.

As explained above, the light source 70 is configured to emit light into the inner bin 66. The light source 70 is within the outer bin 62 and at a base of the inner bin 66. The light may be a colored, white or non-visible light. According to various embodiments, the emitted light may be the excitation emission 8. The light source 70 may be operated to provide the excitation emission 8, provide ambient lighting and provide indicating lighting (e.g., to indicate when the wireless chargers 74 are in use or the type of use). The light source 70 may include an emitter 118, a waveguide 122 and a lens 126. The emitter 118 is configured to emit light into the waveguide 122. The waveguide 122 may be a glass or polymeric component and is configured to emit a diffuse light throughout the inner bin 66 and generally radiating towards the elongate opening 78. The waveguide 122 extends the length of the inner bin 66. According to one embodiment, the waveguide 122 may be a light pipe. The wave guide 122 is configured to emit light along the length of the wave guide 122 such that the entire inner bin 66 is illuminated. Positioned on an opposite end of the waveguide 122 is the lens 126. The lens 126 is configured to receive light from the waveguide 122 and emit light to illuminate the forward portion 30 of the console assembly 22. It will be understood that the wave guide 122 may be replaced with a plurality of light emitting diodes, incandescent bulbs, or other sources of visible and non-visible light.

Figure 5:
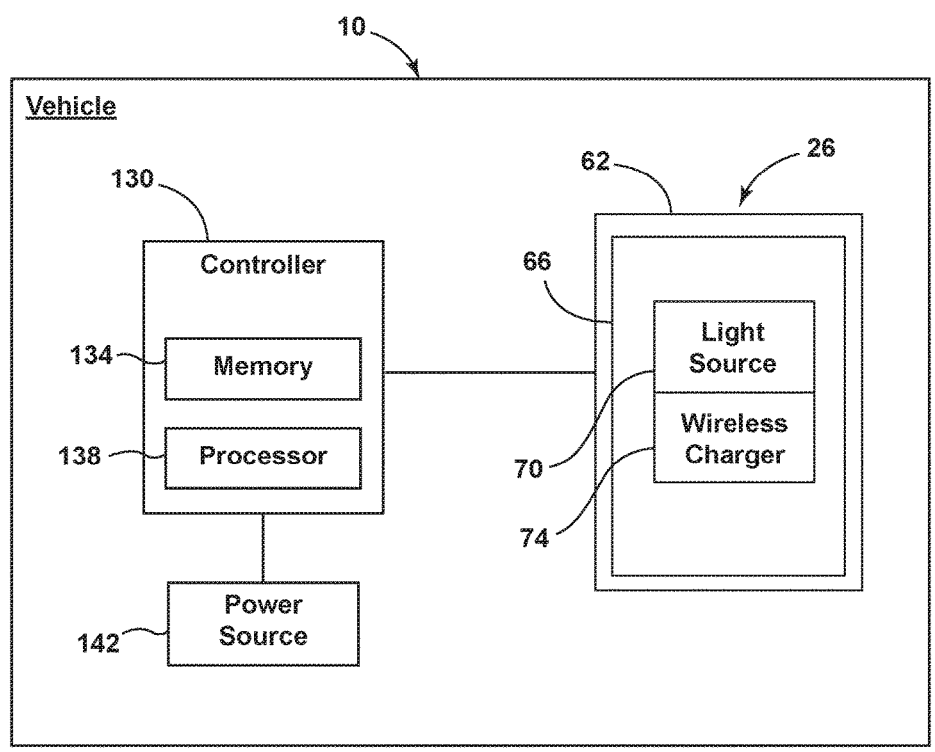
FIG. 5 is a block diagram further illustrating the vehicle, according to one embodiment.

Referring now to FIG. 5, a box diagram of the vehicle 10 is shown in which the console 26 is implemented. The vehicle 10 includes a controller 130 in communication with the light source 70. The controller 130 may include a memory 134 having instructions contained therein executed by a processor 138 of the controller 130. The controller 130 may provide electrical power to the light source 70 via a power source 142 located on board the vehicle 10. In addition, the controller 130 may be configured to control the light output of the light source 70 based on feedback received from one or more vehicle control modules. The controller 130 may be configured to operate the light source 70 and wave guide 122 in order to achieve a specific lighting appearance for the console 26.

Instructions contained in the memory 134 may relate to a variety of different charging and lighting scenarios based on occupant presence or sensed charge level of the electronic device 42. For example, when the electronic device 42 is initially placed in the console 26, the color of the ambient lighting of the light source 70 changes to an appropriate color to indicate charging and after a predetermined period of time (e.g., 30 seconds) goes back to the ambient color. A specific key fob number may be recorded for later use to determine the owner of the electronic device 42. According to one use, if the device 42 is charging and the ignition is turned off, the ambient light from the light source 70 will flash in the appropriate charging color at three times normal intensity to encourage the owner to remember to take the electronic device 42. Further, the memory 134 may trigger a chime or other alert to remind the owner to take the electronic device 42. In another example, the light from the light source 70 may indicate charging status of the electronic device 42. For example, the color of the light from the light source 70 may be defined as red for less than 15% charge, shifting to yellow then green for 80% or more charged. The change in color of the light may be discrete, or a continuous spectrum. If the owner doesn't take out the electronic device 42, ambient lighting is turned off and then it continues to charge until 100% charged. If the electronic device 42 has been charging while the vehicle 10 is unoccupied and a door opens, the light source 70 may flash at triple intensity (to get attention because the electronic device 42 may be hidden and not visible) providing a key owner fob (e.g., key owner fob is defined as the fob that was in the vehicle 10 when the device 42 was placed in the console 26) returns to the vehicle 10. Additionally, the light source 70 may not flash if a valet fob or no fob returns to vehicle 10 when the door opens. Such an example may reduce the likelihood of theft of the electronic device 42. If a foreign object (e.g., coins or metal) is detected in the console 26 and the wireless chargers 74 cannot be operated, the light source 70 may emit red light until the object is removed. While the electronic device 42 is stored in the console 26, stored preferences (e.g., ambient light) from the device 42 may be retrieved once charging communication is established and the preferences may be applied to the vehicle 10.

Use of the present disclosure may offer a variety of advantages. First, the electronic device 42 may be positioned on its side to provide for concealed charging. Second, by constructing the outer bin 62 of a conductive material, an electromagnetic interference shield may be formed to prevent electromagnetic radiation from moving into and out of the console 26. Third, the shape of the inner bin 66 both reflects light from the light source 70 while pushing the electronic device 42 into position to be charged. Fourth, use of the photoluminescent structure 1 offers a unique and attractive lighting experience.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. An illuminated console for a motor vehicle comprising:
    an outer bin;
    an inner bin positioned within the outer bin;
    a light source positioned within the outer bin and configured to emit light into the inner bin;
    a first and a second support member positioned above the inner and outer bins; and
    at least one wireless charger positioned proximate the inner bin.

2. The console of claim 1, further comprising:
    a housing positioned around the outer bin, the housing defining an elongate opening configure to permit access to the inner bin.

3. The console of claim 2, wherein the first and second support members are positioned within the housing and are configured to cover the elongate opening.

4. The console of claim 1, wherein the inner bin comprises a reflective layer disposed on an interior surface of the inner bin.

5. The console of claim 4, wherein the at least one wireless charger is positioned on an exterior surface of the inner bin.

6. The console of claim 1, wherein the outer bin comprises a conductive material configured to minimize electromagnetic interference within the outer bin.

7. The console of claim 1, wherein a plurality of wireless chargers are disposed along an exterior surface of the inner bin.

8. The console of claim 1, wherein the light source is a light guide extending a length of the inner bin.

9. An illuminated console for a motor vehicle comprising:
    a housing defining an elongate opening;
    a first support member and a second support member positioned within the housing and configured to extend over the elongate opening;
    an inner bin having an interior surface and an exterior surface;
    a light source positioned at a base of the inner bin; and
    at least one wireless charger positioned on the exterior surface of the inner bin.

10. The console of claim 9, wherein at least one of the first and second support members comprises an at least partially light transmissive material configured to receive the first emission.

11. The console of claim 9, wherein the first and second support members are configured to support an electronic device.

12. The console of claim 11, wherein the at least one wireless charger is configured to charge the electronic device.

13. The console of claim 12, wherein the at least one wireless charger is a loosely coupled charger.

14. The console of claim 9, wherein the light source comprises a light guide.

15. The console of claim 9, wherein at least one of the first and second support members is movable.

16. An illuminated console for a motor vehicle comprising:
    a housing defining an elongate opening;
    an inner bin positioned within the housing defining an interior surface and an exterior surface, wherein the inner bin is accessible through the elongate opening;
    a reflective coating positioned on the interior surface; and
    a wireless charger positioned on the exterior surface of the inner bin.

17. The console of claim 16, further comprising:
    an outer bin positioned around the inner bin, the outer bin comprising a conductive material.

18. The console of claim 17, further comprising:
    a light pipe positioned at a base of the inner bin configured to emit light into the inner bin.

19. The console of claim 18, wherein the at least one wireless charger is configured to charge an electronic device positioned within the inner bin.

20. The console of claim 19, further comprising:
    a reflective layer positioned on an interior surface of the inner bin.

* * * * *